United States Patent [19]
Ando

[11] Patent Number: 5,600,826
[45] Date of Patent: Feb. 4, 1997

[54] STRUCTURED DATA PROCESSOR FOR CONVERTING BETWEEN SEQUENTIAL AND TREE STRUCTURED DATA

[75] Inventor: Toshiaki Ando, Kanagawa, Japan

[73] Assignee: Fuji Xerox Co., Ltd., Tokyo, Japan

[21] Appl. No.: 219,894

[22] Filed: Mar. 30, 1994

[30] Foreign Application Priority Data

Mar. 31, 1993 [JP] Japan .................................. 5-096676

[51] Int. Cl.⁶ .................................................. G06F 17/30
[52] U.S. Cl. ........................ 395/611; 364/DIG. 1; 364/282.1; 364/282.3; 364/229.41; 395/612; 395/613; 395/614
[58] Field of Search ....................... 395/600; 364/DIG. 1

[56] References Cited

U.S. PATENT DOCUMENTS

| | | | |
|---|---|---|---|
| 4,994,998 | 2/1991 | Anezaki | 364/419.01 |
| 5,088,039 | 2/1992 | Kugimiya et al. | 364/419 |
| 5,230,048 | 7/1993 | Moy | 395/600 |
| 5,295,261 | 3/1994 | Simonetti | 395/600 |
| 5,303,367 | 4/1994 | Leenstra, Sr. et al. | 395/600 |
| 5,321,606 | 6/1994 | Kuruma et al. | 364/419.08 |
| 5,506,985 | 4/1996 | Motoyama et al. | 395/600 |
| 5,530,957 | 6/1996 | Koenig | 395/600 |

FOREIGN PATENT DOCUMENTS

| | | |
|---|---|---|
| 4-84342 | 3/1992 | Japan . |
| 4-278634 | 10/1992 | Japan . |

OTHER PUBLICATIONS

Tremblay, Jean-Paul, et al., "An Introduction to Data Structures With Applications," 2nd edition, McGraw-Hill, Inc. 1984, pp. 367-371.

"Information Processing—Text and Office Systems–Office Document Architecture (ODA) and Interchange Format", final text of ISO 8613-2: 1989, Author: Unknown, pp. 1, 21, 23, 25, 53, 147.

*Primary Examiner*—Thomas G. Black
*Assistant Examiner*—Jean R. Homere
*Attorney, Agent, or Firm*—Finnegan, Henderson, Farabow, Garrett & Dunner, L.L.P.

[57] ABSTRACT

A structured data processor for processing tree-structured data. In the processor, inputted sequential data is arranged in the order of depth, and has depth information defined with respect to the root of the tree structure, i.e., the first data element in the order of depth. At the time the sequential data is converted into the tree-structured data at a data input unit, a structural position determining unit determines the structural position of the tree structure based on the structural depth information of the inputted sequential data. The positions of the data elements whose depths are equal to one another are determined in terms of the sequence of arrangement thereof within the depth.

6 Claims, 7 Drawing Sheets

FIG. 1(a)
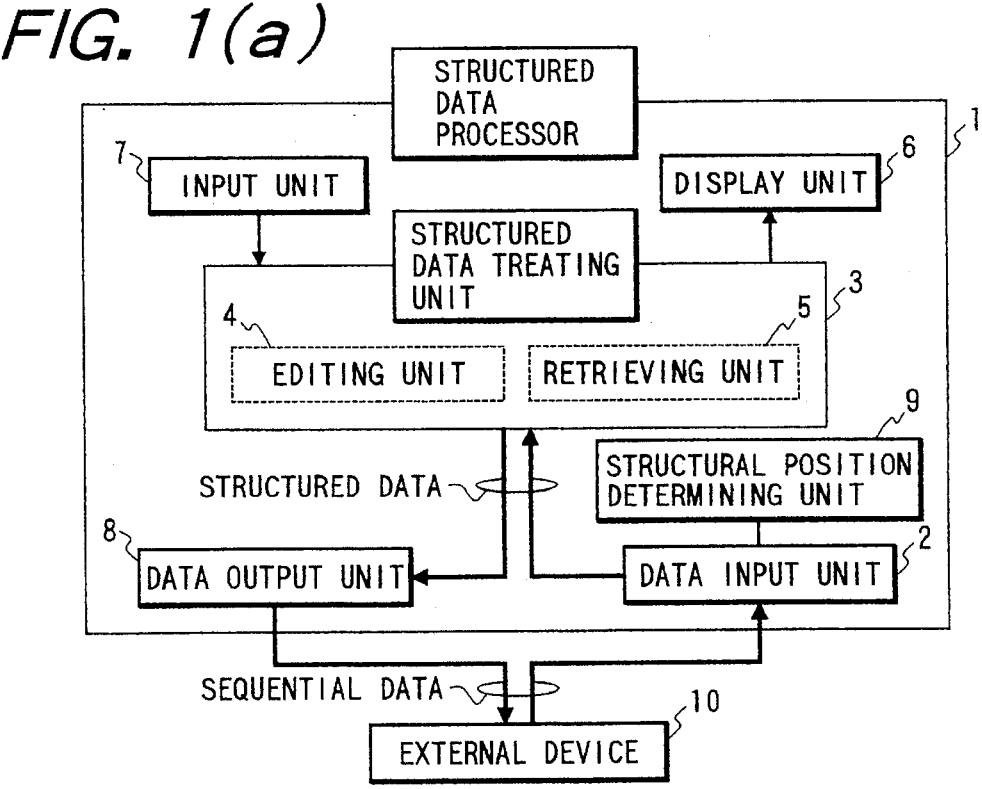
FIG. 2(a)
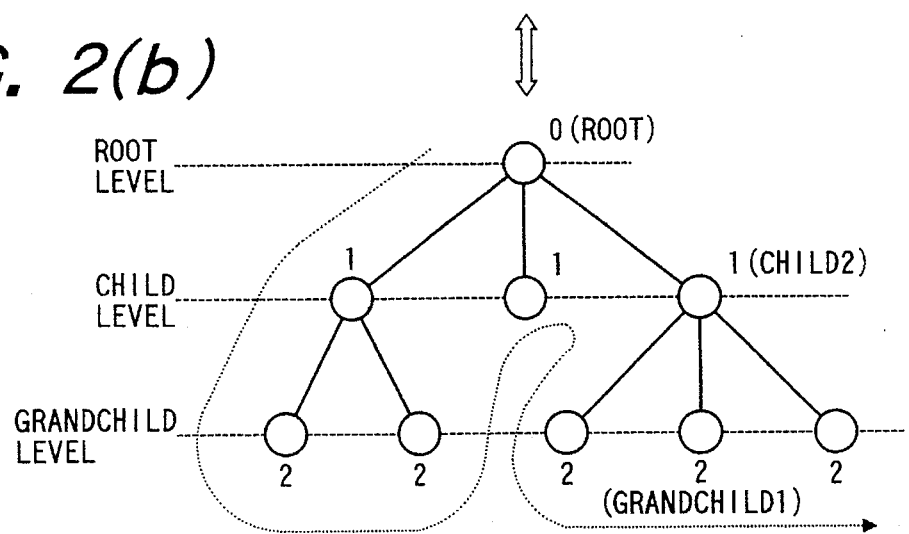
FIG. 2(b)

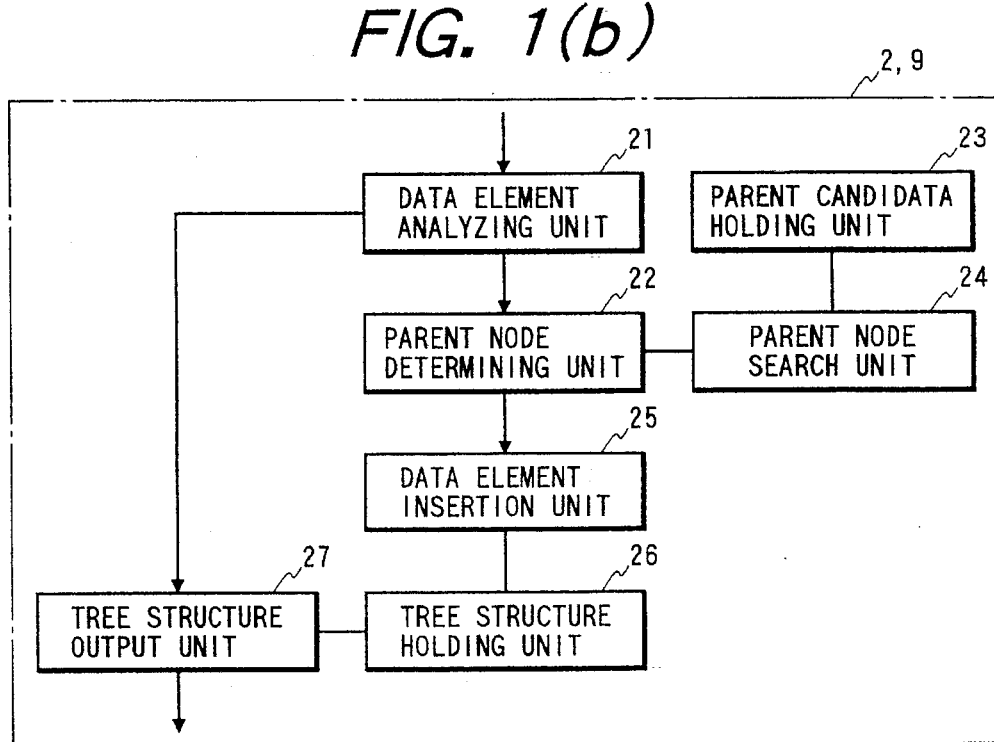
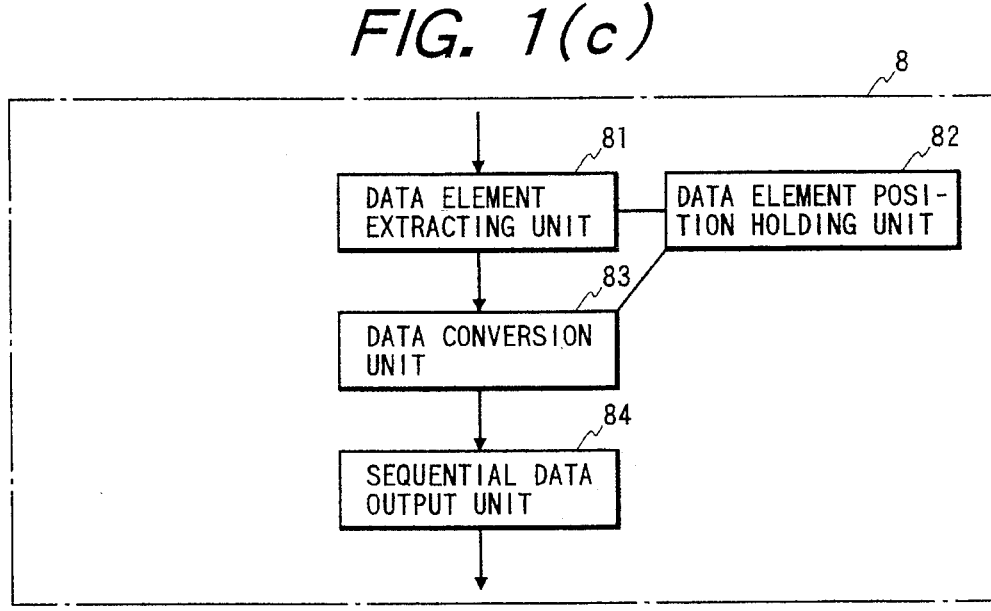

STRUCTURED DATA PROCESSOR FOR CONVERTING BETWEEN SEQUENTIAL AND TREE STRUCTURED DATA

BACKGROUND OF THE INVENTION

The invention relates to a structured data processor that processes tree-structured data.

In a method of representing structured data constituting a tree structure, data elements are arranged in the order of depth and the structural position information of each data element is represented in terms of a numeric string. In generally known method, a data element is represented in the form of a numeric string with a single numeral assigned to a single depth, i.e., brotherhood and with numerals arranged in the order of depth. It is each numeral in the numeric string that represents the sequence in each depth. In this representing method, the position information of a data element whose depth is large has a larger number of numerals in the numeric string. A specific example is an "object identifier" indicated in ISO8613ODA (Open Document Architecture).

FIGS. 11(a) and 11(b) are diagrams illustrative of a conventional method of representing structured data. FIG. 11(b) shows an example of data of a tree structure. A data element of the tree structure is indicated by "o". This tree structure has below the root-level data element three child-level data elements, and below the leftmost child-level data element two grandchild-level data elements, below the rightmost child-level data element three grandchild-level data elements. Sequential data as shown in FIG. 11(a) is an example of methods of representing such tree structure. In this example, the data in parentheses "[ ]" within the sequential data represents a data element. A numeric string partitioned by a first symbol "/" out of the data in parentheses "[ ]" indicates structural position information; the next symbol "@" indicates attribute information such as an identifier appended to the data element in the structured data. In the case of a structured document, "@" includes the corresponding sentence data and the like. The last character string indicates a name of the data element, which may be omitted. The data representing the data element may have either a fixed length or a variable length.

A numeric string represents structural position information so that each numeral represents position information on each depth level. A numeric string represents a depth with respect to the root in accordance with an order. For example, the first numeral represents the depth of the root, and the second numeral represents the depth of a child of the root. That is, the number of numerals in a numeric string represents the depth. The order is supposed to start with 0. Each numeral in the numeric string represents the sequence of brotherhood data elements. This is how a structural position is determined from position information. For example, a numeric string "0/2/1" that is the position information of "[0/2/1@GRANDCHILD1]" out of such sequential data as shown in FIG. 11(a) indicates that a data element "GRANDCHILD 1" is located at the first position on a grandchild level, i.e., below a second child-level data element "CHILD 2", i.e., below the 0th root-level data element "ROOT 0".

By apparently handling the data of the tree structure shown in FIG. 11(b) as such sequential data as shown in FIG. 11(a), such data can be shared with an external device or devices that cannot handle structured data of a tree structure as it is. For example, as disclosed in Japanese Patent Unexamined Publication No. 4-84342, data of a tree structure can be stored using an ordinary data management system that cannot handle data of a tree structure.

FIG. 10 is a block diagram of a conventional structured data processor. In FIG. 10, reference numeral 1 designates a structured data processor; 2, a data input unit; 3, a structured data treating unit; 4, an editing unit; 5, a retrieving unit; 6, a display unit; 7, an input unit; 8, a data output unit; and 10, an external device. The structured data processor 1 includes the data input unit 2, the structured data treating unit 3, the display unit 6, the input unit 7, and the data output unit 8. Sequential data as shown in FIG. 11(a) is inputted as structured data from the external device 10 such as a data storage device or a data transmission device; the inputted data is treated into structured data of such a tree structure as shown in FIG. 11(b); and the treated data is outputted as sequential data as shown in FIG. 11(a). By apparently inputting and outputting the data in the form of sequential data in this way, the structured data can be utilized by external devices not capable of directly handling structured data.

The data input unit 2 receives such sequential data as shown in FIG. 11(a) from the external device 10, converts the received data into structured data of such tree structure as shown in FIG. 11(b), and outputs the converted data to the structured data treating unit 3. Similarly, the data output unit 8 receives such structured data as shown in FIG. 11(b) from the structured data treating unit 3, converts the received data into such sequential data as shown in FIG. 11(a), and outputs the converted data to the external device 10.

The structured data treating unit 3 includes the editing unit 4, the retrieving unit 5, and other structured data processing units, displays information on the display unit 6, and processes input data from the input unit 7, etc.

The operation of the structured data processor 1 can be divided roughly into three parts: a data input operation, a data treating operation, and a data output operation. These three operations will be described in turn.

In the data input operation, a data element of structured data arranged in the order of depth is inputted to the data input unit 2 in the form of sequential data from the external device 10 that is not capable of handling the structured data as it is, the external device 10 being, e.g., a data transmission device or a data storage device. The structural position of the data element is uniquely determined from the position information of the data represented in the form of a variable-length numeric string, and then a data element of structured data is generated from data inputted thereafter, e.g., from data following "@" shown in FIG. 11(a), and the generated data element is built up in the position of the previous structured data.

In the data treating operation, editing, printing, and the like are effected taking advantage of any unit incorporated into the structured data treating unit 3 other than the input and output units. One or more units may be additionally provided to implement a special treatment as the case may so require. For example, in editing, subject data displayed on the display unit 6 is selected by the input unit 7, and subjected to move, deletion, copy, or the like at the editing unit 4. Editing comes in two operations: a structural operation for structured data and a content operation for structured data contents. A structural editing unit is required for structural editing, and a content editing unit is required for structured data content editing. For example, to retrieve a data element within a structure, the retrieving unit 5 is required.

In the data output operation, structured data is outputted in the form of sequential data to the external device 10 that cannot handle structured data as it is, such as the data transmission device and the data storage device. That is, the data output unit 8 converts position information included in the data into a variable-length numeric string, gives such converted data to a data element, converts the data element of the structured data into sequential data that can be outputted in the order of depth, and outputs such sequential data to the external device 10.

A procedure for outputting data elements in the order of depth is generally known. First, the position information of a data element that constitutes the root of a tree structure is formed into a numeric string consisting of a single numeral "0". Once the position information and attribute information of the root have been outputted, the position information of a child is prepared and outputted if any. If another child is present, the above operation is repeated recursively. Since the position information of a child has a depth deeper than that of the last data element, a numeral "0" is added to the position information of the child. If there are many children, the last numeral that has been added is sequentially incremented, numbering them from "0" in the ascending order. For example, the children of a data element "0/2" are "0/2/0", "0/2/1" and so on.

In the case of using the variable-length data that is dependent on the structural depth of a data element having the thus described position information, data indicating the number of numerals or data indicating a partition between numeric strings is necessary. Further, a disadvantage that the data volume increases dependent on the structural depth must also be taken care of. This disadvantage is encountered in any data processing including transmission, comparison, storage, and the like. Generally, data transmission with an external device takes more time than that of data transmission within the system. In addition, the data transmission time is substantially proportional to the data volume. This means that a large data transmission volume entails much time for transmission. Further, a large data volume entails a large memory. As a result, a volume of data that can be processed at a time becomes small. Still further, the data volume becomes large incommensurate with the information volume, thus not allowing much information to be stored in the data storage device. An expensive, large-capacity data storage device is hence used for data storage. These are disadvantages associated with the conventional system.

Let us think about the data volume with a simple example. Let a bifurcated tree structure of depth 10 with the depth of the root being 0 be represented. It is supposed that the size of a single numeral is equal to 1 byte and that a data end is counted as 1 byte for convenience. The data volume necessary for the position information of the root is at most 2 bytes including the data end. The position information of a bottommost data element, i.e., a data element whose depth is 10 has 11 numerals, thus requiring 12 bytes including the data end. Since the number of bottommost data elements is $2^{10}=1024=1$ K data elements, the capacity necessary for all the bottommost data elements is 12 bytes×1 K data elements=12 kilobytes. Similarly, a calculation of the position information necessary for data elements of another depth indicates that 22 kilobytes is necessary to represent a structure having 2 K data elements in a bifurcated tree whose depth is 10.

Similarly, a bifurcated tree of depth 20 requires 42 megabytes to represent a structure having 2 M data elements. Since the position information of each of all the data elements starts with "0", which is self-explanatory, such heading numeral "0" may be omitted. Even with such omission, a bifurcated tree of depth 10 requires 20 kilobytes, and a bifurcated tree of depth 20, 40 megabytes.

A representation of a single numeral using 1 byte can accommodate only 255 brothers. This is a tremendous limit in dealing with a large volume of data of the same format such as a hierarchical database. If a single numeral is represented with 2 bytes, then a bifurcated tree of depth 10 requires 40 kilobytes, and a bifurcated tree of depth 20 requires 80 megabytes.

Data compression technology of recent development has achieved a compression ratio of ½ or about ⅒ at the maximum. Even with such data compression technology, a bifurcated tree of depth 10 requires 4 kilobytes, and a bifurcated tree of depth 20 requires 8 megabytes. In addition, incorporation of such a data compression/development device is costly in terms of a system as a whole.

SUMMARY OF THE INVENTION

The invention has been made in view of the above circumstances. Accordingly, an object of the invention is to provide a structured data processor capable of reducing a volume of sequential data to be inputted from and outputted to an external device or devices.

To achieve the above object, the invention provides a structured data processor for processing structured data of a tree structure, including data input means for receiving sequential data and converting the received sequential data into data of the tree structure, the sequential data having data elements arranged in an order of depth, each data element forming a node of the structured data and having structural depth information; and structural position determining means for determining a structural position based on the structural depth information of a data element of the sequential data inputted at the time of converting the sequential data by the data input means.

Further, the invention provides a structured data processor for processing structured data of a tree structure, including data output means for converting data of the tree structure into sequential data and outputting the sequential data, the sequential data being arranged in an order of depth and having structural depth information.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings, FIG. 1(a) is a block diagram showing a structured data processor, which is an embodiment of the invention;

FIG. 1(b) is a block diagram showing a detailed construction of a data input unit and a structural position determining unit shown in FIG. 1(a);

FIG. 1(c) is a block diagram showing a detailed construction of a data output unit shown in FIG. 1(a);

FIGS. 2(a) and 2(b) are diagrams illustrative of a method of representing structured data used in the invention;

DETAILED DESCRIPTION OF THE PREFERRED EMBODIMENTS

Figure 10:
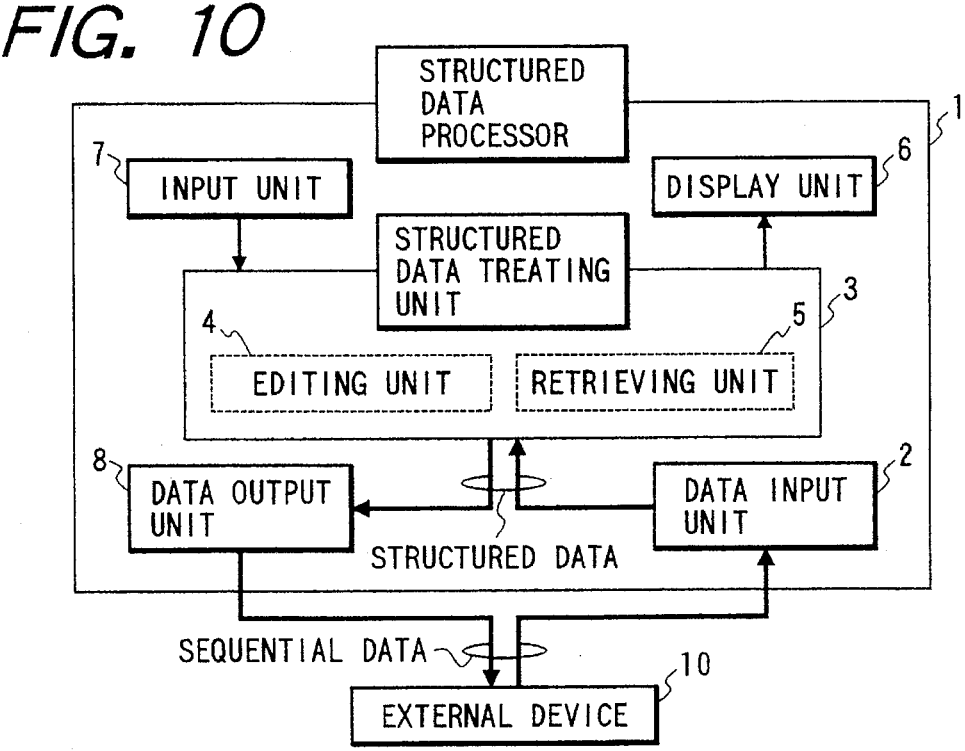
FIG. 10 is a block diagram of a conventional structured data processor.

FIG. 1(a) is a block diagram showing a structured data processor, which is an embodiment of the invention. In FIG. 1, parts and components similar to those in FIG. 10 are designated by the same reference numerals, and the descriptions thereof will be omitted. Reference numeral 9 designates a structural position determining unit. A data input unit 2 receives sequential data that is arranged in the order of depth and that has structural depth information. Based on the depth information obtained from the inputted sequential data and the depth information of a structure being currently generated, the structural position is determined using the structural position determining unit 9, so that tree-structured data is generated. A data output unit 8 generates and outputs from the tree-structured data sequential data that has structural depth information and that is arranged in the order of depth.

Figure 11A:
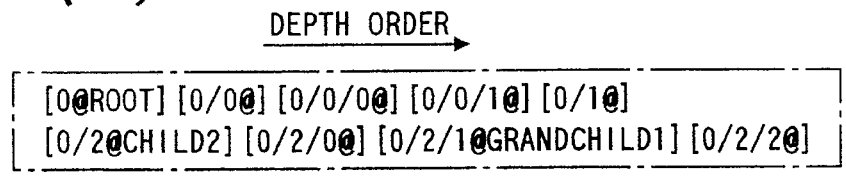
FIGS. 11(a) and 11(b) are diagrams illustrative of a conventional method of representing structured data.
Figure 11B:
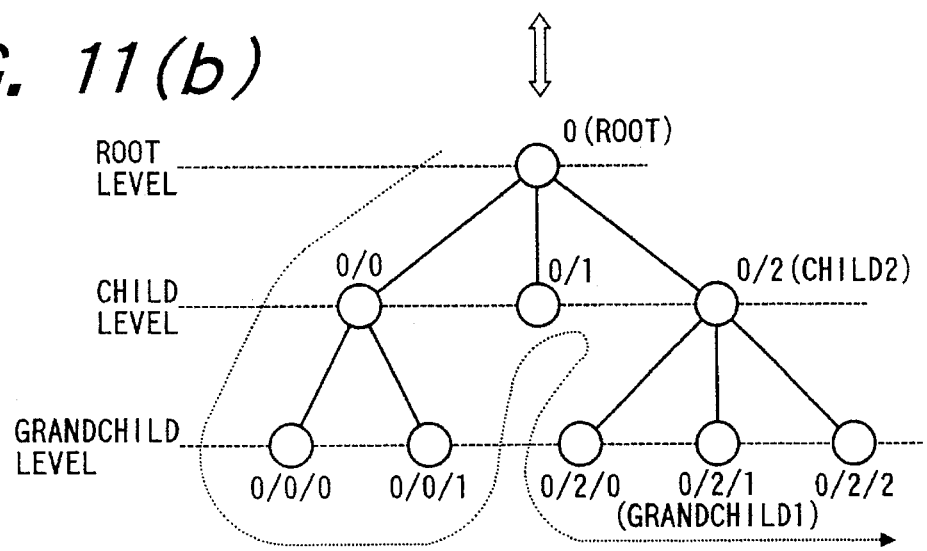

FIGS. 2(a) and 2(b) are diagrams illustrative of an exemplary method of representing structured data used in the invention. FIG. 2(a) shows sequential data; and FIG. 2(b) shows exemplary tree-structured data. The tree structure is similar to that shown in FIG. 11(b). In FIGS. 2(a) and 2(b), depth information is represented by numeral. For convenience, the numeral is handled as being incremented with increasing depth. However, the depth information is not limited thereto; the depth information may be acceptable as long as depths can be compared with each other. There is no limitation to how a value is represented; e.g., the increasing ratio of a depth, a value indicating a data type such as a character string and a numeric string may take any form. In the sequential data shown in FIG. 2(a), data in parentheses "[ ]" represents a data element. The first numeral of the data in parentheses "[ ]" represents depth information, and "@" represents attribute information of the data element. The last character string is the name of the data element, which may be omitted.

In the example shown in FIGS. 2(a) and 2(b), used as depth information are numeral "0" on a root level, numeral "1" on a child level, and numeral "2" on a grandchild level. A data element that constitutes a root comes first in the order of depth and consists of the depth information "0", the attribute information "@", and the name "root". To arrange data elements in the order of depth, the data elements having the same depth are arranged so as to appear in a predetermined order. For example, if the leftmost element is to appear first, what comes after the root-level element is the leftmost element on the child level. What comes next is a grandchild-level element and so on, if any. In the example shown in FIG. 2(b), two grandchild-level elements are arranged below the leftmost element on the child level. When the elements on the grandchild level and so on run out, a next element on the child level, i.e., the element on the child level in the middle in FIG. 2(b) is arranged. Further, among the elements shown in FIG. 2(b), the element having the name "CHILD 2" on the child level is arranged, and the arrangement of data elements is continued with the elements on the grandchild level.

The data input unit 2 of FIG. 1(a) receives sequential data having such a structure as shown in FIG. 2(a), and converts the data elements arranged in the order of depth into such tree-structured data as shown in FIG. 2(b). The data output unit 8 traces such tree-structured data as shown in FIG. 2(b) in the order of depth, and outputs such sequential data as shown in FIG. 2(a). Here, the position information to be outputted is only the depth information.

Let us consider how data can be reduced by such sequential data while taking a look at the above-mentioned example of the bifurcated tree. In the sequential data used in the invention, it is only the depth information that is given to each data element as structural position information. Although 4 bytes are necessary as numeric data for depth information in the above-mentioned example of the bifurcated tree, only a total of 8 kilobytes for a bifurcated tree of depth 10, or a total of 16 megabytes for a bifurcated tree of depth 20 is necessary. Actually, since 1 byte is sufficient for depth information, it is only 2 kilobytes that are required for the bifurcated tree of depth 10, and 2 megabytes for the bifurcated three of depth 20. In comparison with the conventional sequential data, a reduction of 1/20 of data can be achieved for the bifurcated tree of depth 10, and a reduction of 1/40 of data can be achieved for the bifurcated tree of depth 20. Considering the fact that as many as 4 kilobytes have been necessary for the bifurcated tree of depth 10 and as many as 8 megabytes for the bifurcated tree of depth 20 in the conventional structured data processor even with the latest data compression technology, it is understood that the system of the invention is advantageous in both data capacity and processing cost compared with the conventional processor having a built-in data compressor. A data compression/development device can, of course, be incorporated into the structured data processor of the invention or an external device. Such a configuration makes the system more advantageous in capacity, contributing to high-speed data transmission, which is obvious.

Returning to FIG. 1(a), a structured data treating unit 3 executes structured data treatment. The structured data treating unit 3 includes units required for treating data such as an editing unit 4 and a retrieving unit 5. For example, if structured data is of a structured document, an allocating unit may be provided to achieve automatic allocation. Accordingly, a plurality of treating units may be arranged. The number, configuration, and the like of units required for treating structured data is not particularly limited. Similarly, the conventional data input unit and data output unit may be arranged to allow conventional data to be used.

Generally, data elements (logic objects) are arranged in the order of depth (logic sequence) in a structured document typically represented by ODA. Therefore, when structured data, which is an object to be processed, is formed into data for a structured document represented by ODA by adding to the structured data treating unit 3 some units necessary for editing/treating/printing/displaying the structured document, the structured data processor 1 of the invention can be used as a structured document processor. The structured data processor 1 of the invention can also be used as a CAD system if structured data representing geometric figures is taken as subject data and adding to the structured data treating unit 3 a geometric figure processing unit, a three-dimensional data displaying unit, and the like for processing geometric figure data having three-dimensional coordinates.

The structural position determining unit 9 determines not only the depth information belonging to a data element but also a structural position based on the order of the data element. This ordering may not necessarily require that data elements be arranged physically nor that the order of input be the order of depth. What is required, however, is that the order of a data element arranged in the order of depth be compared with a depth by some kind of unit. For example, data representing the order of depth may be given to each data element, or an index concerning the order of depth may be prepared separately. If data elements having depth information are not arranged in the order of depth, all the data are inputted; then, the data are rearranged in the order of depth; and finally, the rearranged data are dealt as the input data to be processed by the data input unit. In the following description, the order in which data is inputted is supposed to be the order of depth, and the depth information is given to a data element as auxiliary information.

Upon input of such sequential data as shown in FIG. 2(a) by the data input unit 2 from the external device 10, a data element analyzing unit 21 of the data input unit 2 analyzes the inputted sequential data to extract a portion equivalent to a data element as shown in FIG. 1(b). The extracted data element as a tree structure is inputted to a parent node determining unit 22.

Figure 4:
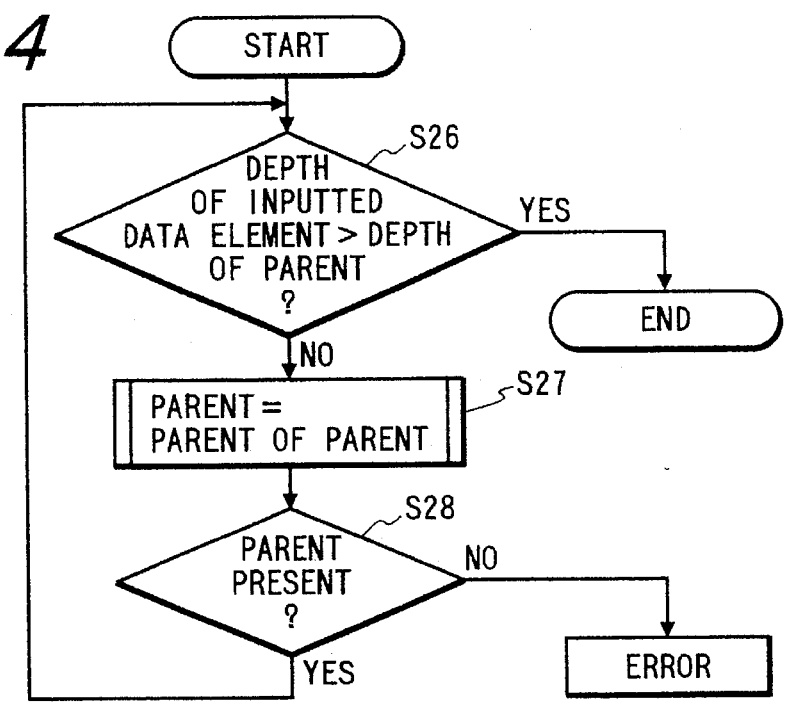
FIG. 4 is a flowchart illustrative of a parent search processing portion.

A parent candidate holding unit 23 holds a last data element and the parent node determining unit 22 looks for the parent node based on the depth information of the data element by a parent node search unit 24. The parent node determining unit 22 retrieves the depth information from the data element and determines the parent node in accordance with an algorithm as shown in FIG. 4, which will be described later. In the case of using an algorithm shown in FIG. 7, which will also be described later, the parent candidate holding unit 23 holds a plurality of candidates at one time, and thus requires no parent node search unit.

A data element insertion unit 25 generates tree structured data by inserting respective data elements to a parent node, and a tree structure holding unit 26 holds the tree structured data that is being generated.

When data elements to be analyzed by the data element analyzing unit 21 have run out, a tree structure output unit 27 delivers the completed tree structure data to the structured data treating unit 3 within the processor.

Further, as shown in FIG. 1(c), to output the tree structured data from the structured data treating unit 3 within the processor, a data element extracting unit 81 extracts data elements from the tree structured data in the logic sequence. The depth information of a data element extracted in order to extract a next data element is held in a data element position holding unit 82.

A data conversion unit 83 converts an extracted data element into sequential data while referring to the depth information of the data element held at the data element position holding unit. The converted sequential data is outputted to the external device by a sequential data output unit 84.

An operation of the structured data processor, which is the embodiment of the invention, will now be described. The structured data treating unit 3 receives a user's instruction from an input unit 7 to execute processing desired by the user with the editing unit 4, the retrieving unit 5, not shown printing unit, or the like. The processing other than the data input/output processing, such as the structured data treatment processing, will herein be omitted since such processing is general structured data processing represented by the structured document processing, CAD, and the like.

Figure 3:
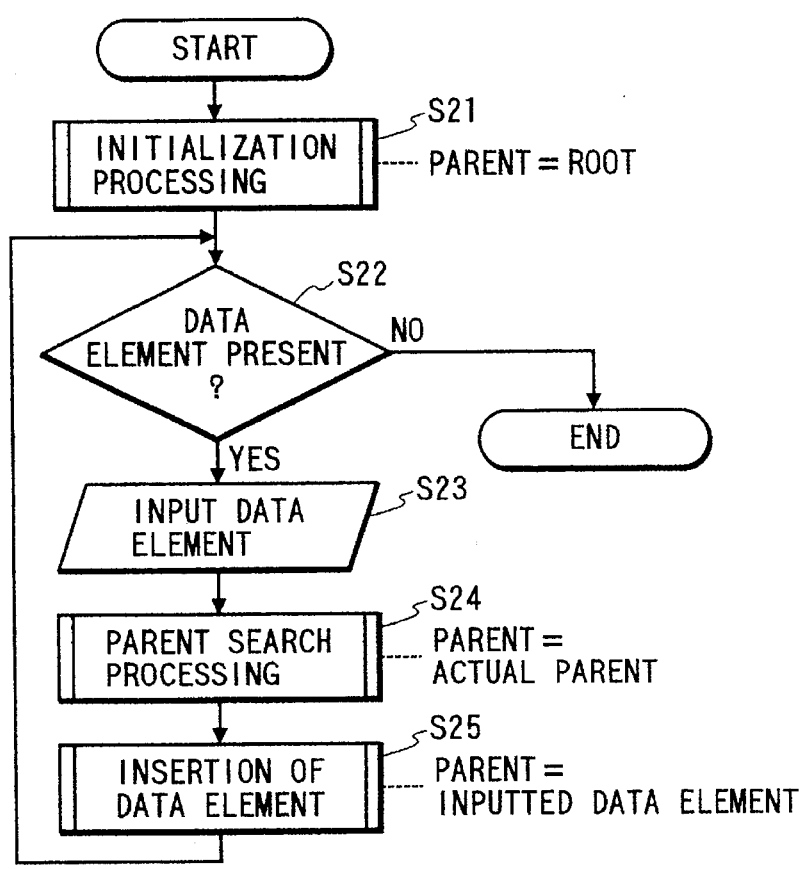
FIG. 3 is a flowchart illustrative of an example of data input processing.

FIG. 3 is a flowchart illustrative of an example of data input processing; and FIG. 4 is a flowchart illustrative of a parent search processing portion. The data input processing is activated when the user specifies the data input processing through the input unit 7, when input data is transmitted from the external device, or the like. Structured data is generated while sequential data is being inputted in the order of depth.

In step S21 of FIG. 3, the system is initialized. In this step, preparations for data input are made by executing pre-processing necessary for the data input processing, and then a single data element that forms the root of a tree structure is inputted, and substituted for a variable PARENT. The variable PARENT represents a structural parent candidate for a next inputted data element and of the deepest in structural position. Actually, the variable PARENT is the last data element built in the structure.

In step S22, whether a data element is present is checked. When the data elements of the sequential data have run out, post-processing is executed to terminate the data input processing. If a data element is still present, the data element input processing, the structure building processing in steps S23 and the following will be executed.

In step S23, the input processing for a data element is executed. The input processing includes the steps of: inputting the heading to the ending data of a next data element out of data elements arranged in the order of depth; and reproducing such data element. For example, in the example shown in FIGS. 2(a) and 2(b), a sequential data portion in parentheses "[ ]" is inputted as a single data element and a data element corresponding to "○" shown in FIG. 2(b) is generated utilizing the depth information and the attribute information "@".

In step S24, the parent search processing is executed by the structural position determining unit 9. The data element substituted for the variable PARENT is the parent candidate for the data element inputted in step S23. Whether or not the parent candidate is actually the parent for such data element is judged from the depth information of the inputted data element. Such judgment is made by checking that the depth of the data element in the variable PARENT is smaller than that of the inputted data element. Such judgment is made in step S26 of FIG. 4. If the depth of the data element in the variable PARENT is smaller, then the data element in the variable PARENT judged to be the parent. If the depth of the data element in the variable PARENT is equal to or greater than that of the inputted data element, the parent of the data element substituted for the current variable PARENT is taken as a new parent candidate and is newly substituted for the variable PARENT in step S27; whether the data element that has newly been substituted for the variable PARENT is present is checked in step S28; and the processing steps in S26 and the following are repeated.

In step S25, insertion of a data element is effected. That is, the inputted data element is connected to the tree structure as the last child to the parent found in step S24. The inputted data element is substituted for the variable PARENT to make the substituted variable a parent candidate for a next data element. This completes the input processing for a single data element. Returning to step S22, the input processing for a next data element is repeated until the data elements to be inputted run out.

Figure 5:
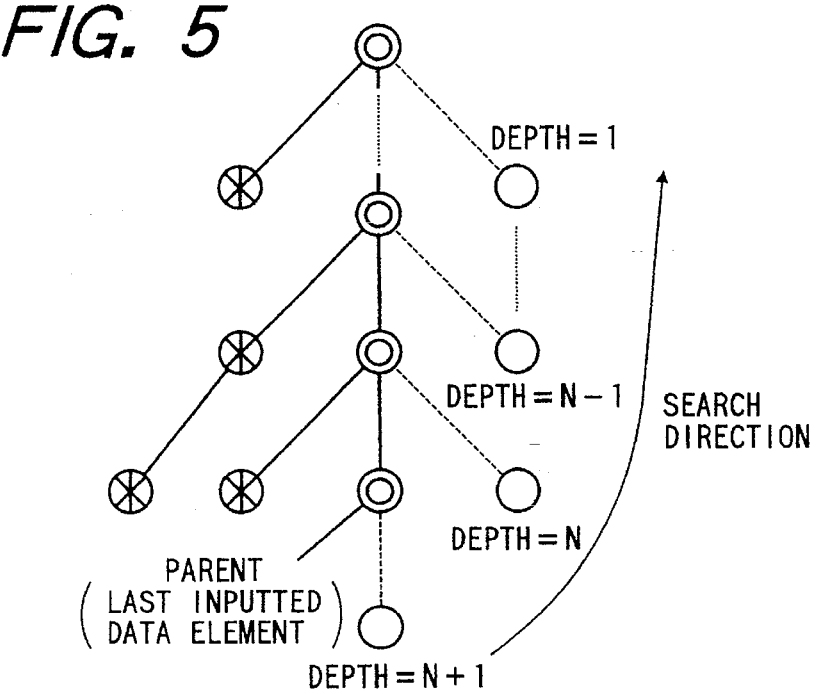
FIG. 5 is a diagram illustrative of a method of determining a structural position.

FIG. 5 is a diagram illustrative of a method of determining a structural position. In FIG. 5, a symbol "⊛" designates an already secured data element; "⊙", a data element that can become a parent candidate for already secured data elements; and "o", a position of a possible candidate for an inputted data element. FIG. 5 shows processing step S24 of FIG. 3, or a method of determining the position of a parent shown in FIG. 4. In the case of inputting a data element in terms of the order of depth, a data element which will become the parent for sure is inputted first, and the structural position thereof is secured. The data element that has been inputted last in FIG. 5 is substituted for the variable PARENT. The data elements that have been inputted are structured from the root thereof.

Supposing that the depth of a data element in the variable PARENT is N, then data elements to be inputted may possibly have depths 1 to N+1. The data elements designed by "⊙" become parent candidates therefor and those designated by "o" possibly take such positions. Here, whether or not the data element in the variable PARENT, which is a parent candidate, is the parent is checked in the order of greater depth. A data element in the variable PARENT when such data element has a depth smaller than that of the inputted data element is judged to be the parent. Once the parent has been found, the inputted data element is inserted into the tree structure as a child of the parent. In this way, the position of the data element is secured. If the depth of an inputted data element is not equal to 1 to N+1, the input is processed as an error.

Figure 6:
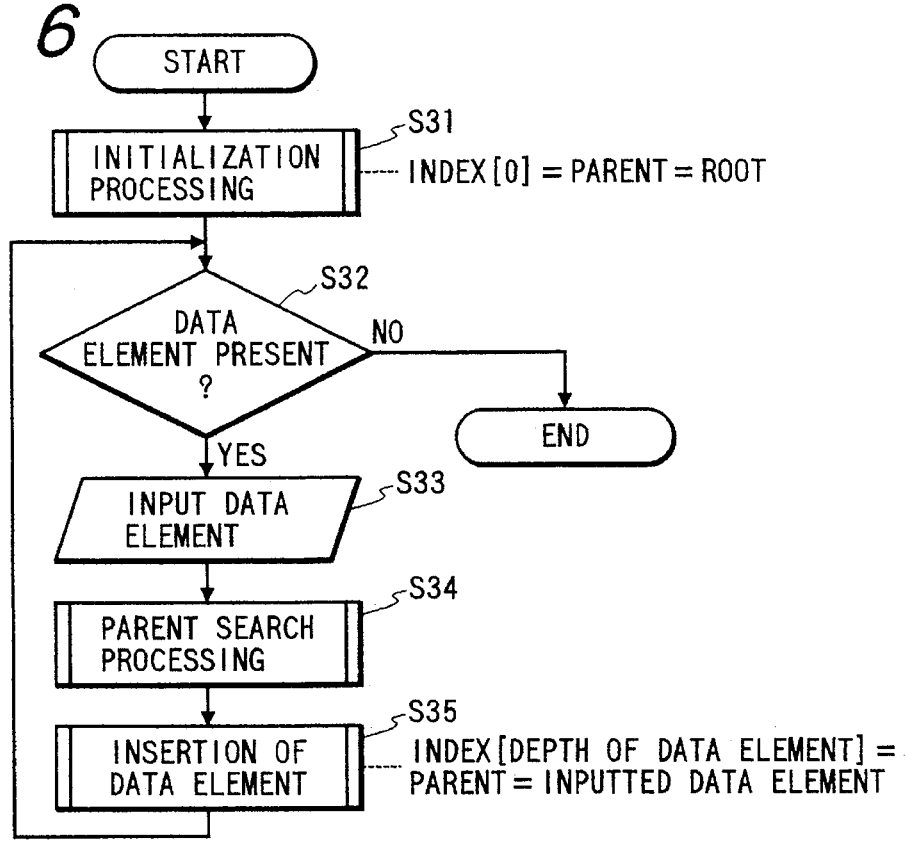
FIG. 6 is a flowchart illustrative of another example of data input processing.
Figure 7:
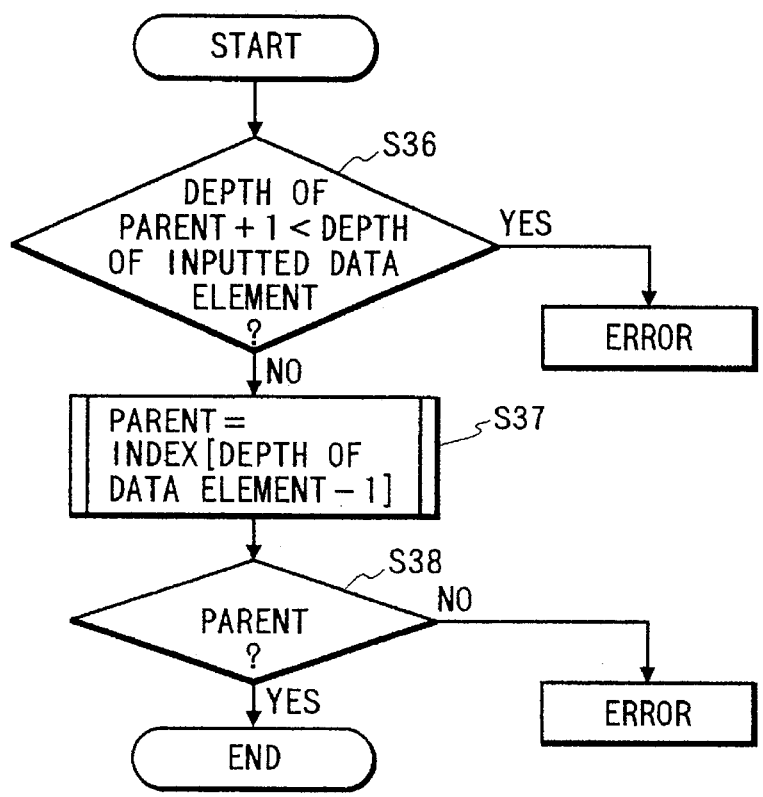
FIG. 7 is a flowchart illustrative of a parent search processing portion in the example shown in FIG. 6.

FIG. 6 is a flowchart illustrative of another example of data input processing; and FIG. 7 is a flowchart illustrative of a parent search processing portion of the example shown in FIG. 6. In this example, an index of data elements with depth as a key is prepared for the last data element that is inputted every depth. The position of an inputted data element can be determined directly by referring to the index based on the depth information of the inputted data element. Since it is not necessary to make comparison by sequentially changing parents in this example, the processing speed can be improved. In FIGS. 6 and 7, an array INDEX [ ] is prepared for storing the last data element per depth. However, an index area of such a size as to accommodate the maximum depth must be reserved.

In step S31 of FIG. 6, the system is initialized. In this step, a root is substituted for depth 0 of the array INDEX [ ] in addition to the initialization processing effected in step S21 of FIG. 3. In step S32, whether a data element is present is checked, and in step S33, a data element is inputted.

In step S34, the parent search processing is executed by the structural position determining unit. In step S36 of FIG. 7, it is checked that the depth of the newly inputted data element does not exceed the depth of the data element in the variable PARENT, i.e., of the last inputted data element plus 1. The depth of the newly inputted data element does not usually exceed such depth plus 1. The parent of the inputted data element is an array INDEX [Depth of inputted data element–1]. That is, the parent data element is instantly found. In step S37, the array INDEX [Depth of inputted data element–1] is referred to and is substituted for the variable PARENT. In step S38, whether a parent is present is checked, and the parent search processing is then terminated.

In step S35, not only the inputted data element is inserted into a tree structure, but also the just inputted data element is substituted for both variable PARENT and array INDEX [Depth of inputted data element]. This completes the processing for a single data element. Returning to step S32, the same processing is repeated until the data elements run out.

Figure 8:
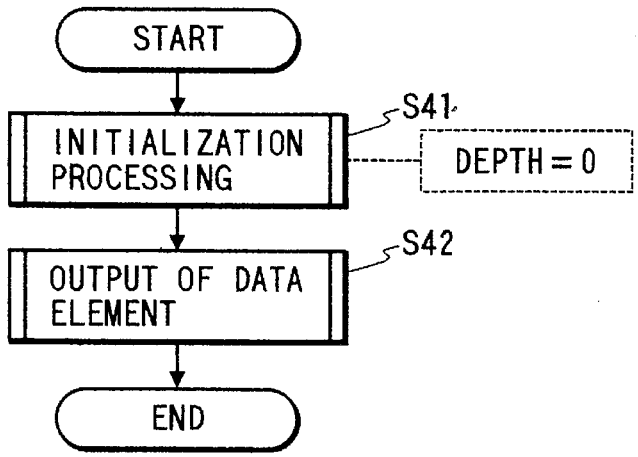
FIG. 8 is a flowchart illustrative of an example of data output processing.
Figure 9:
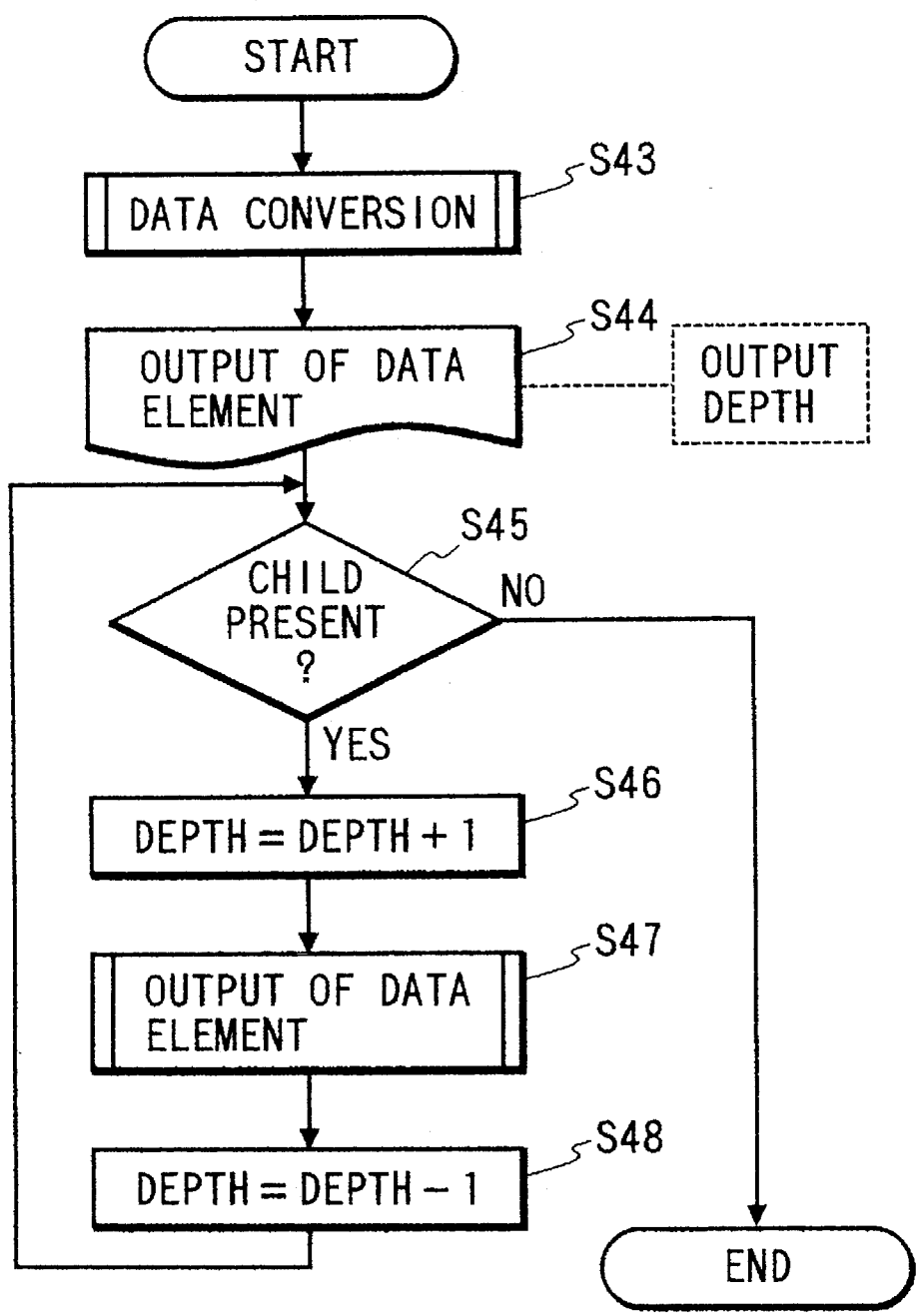
FIG. 9 is a flowchart illustrative of a data element output processing portion.

FIG. 8 is a flowchart illustrative of an example of data output processing; and FIG. 9 is a flowchart illustrative of a data element output processing portion. The data output processing is activated when the user specifies the data output processing through the input unit 7, when the structured data treatment processing is terminated, or the like.

In step S41, the system is initialized. In this step, a variable DEPTH is reset to 0, and a root is taken out. In step S42, the data element output processing is executed.

In step S43 of FIG. 9, element data of such a tree structure as shown in FIG. 2(b) is converted into element data of such sequential data as shown in FIG. 2(a). In step S44, the content of the variable DEPTH, i.e., the structural depth information is appended to the element data, and the thus processed data is outputted.

The processing from step S45 to step S48 relates to the child of the data element outputted in step S44. In step S45, whether a child is present is checked. If no child is present, the child output processing at this level is terminated. If a child is present, the variable DEPTH is incremented by 1 in step S46. In step S47, the data element output processing, i.e., the processing shown in FIG. 9 is recursively called, so that the output processing for a single child-level data element is executed. At the same time, the data element output processing for data elements on the grandchild level and levels lower than the grandchild level is recursively called, and the processed data is outputted. When the grandchild-level data elements have run out, the processing returns to the recursively called data element output processing. Thus, in step S48, the variable DEPTH is decremented by 1 to return to the parent level, and the processing from step S45 to step S48 is repeated, so that the output processing can be executed for all child-level data elements.

When the output processing for child-level data elements of the root has been completed, the processing of step S42 is terminated. Then, the post-processing is executed as the last step to wind up the data output processing.

A specific example of the structured data processor, which is the embodiment of the invention, will be described. Generally, the structured data processor of the invention can be embodied in a computer system.

The data input unit 2 may include: an input device of the computer system; software for controlling the device, inputting data, and generating structured data; and a CPU for processing such software. Sequential data inputted from the data input device externally connected to the computer system are converted into structured data elements. The generated data elements are built up and outputted to the structured data treating unit 3 as structured data.

The data output unit 8 may include: a data output device of the computer system; software for controlling the device and outputting the data elements of structured data; and a CPU for processing such software. Each data element is converted into data that can be outputted to an external device of the computer system, and by controlling the data output device, the data is outputted in the form of sequential data.

The external device 10 for inputting data to the data input unit 2 and receiving data outputted by the data output unit 8 may be implemented by, e.g., a data communication device, which can exchange information with the input/output unit through an interface. Similarly, if the external device is implemented by a data storage device such as a magnetic disk device, then data can be stored. More than one external device may be provided. In other words, a plurality of external devices may be connected. In this case, the data input unit 2 and the data output unit 8 may be arranged so as to be shared in common with the respective external devices, or a plurality of data input unit 2 and a plurality of data output unit 8 may be provided. Further, it is not necessary that input/output unit be connected to the same external device; i.e., an external device for inputting data to the data input unit 2 and an external device for receiving data from the data output unit 8 may be arranged separately. For example, an automatic structured data routine processor for automatically processing a routine may be implemented by connecting a data communication device for input and a data communication device for output to the processor and causing the structured data treating unit 3 to execute routine data treatment processing.

The structural position determining unit 9 may include: software for operating data elements; and a CPU for processing such software, or may be implemented by hardware. The depth information is obtained from a data element and the obtained depth information is compared with the depth of a parent candidate data element to specify the structural position of the data element.

The input unit 7 may be implemented by a pointing device such as a keyboard, a mouse, or a touch panel, and gives a user's instruction to the system. The display unit 6 may be implemented by a CRT or a LCD, and may include a voice generator such as an acoustic speaker.

For example, a structured document editing device may be implemented by using the structured data processor of the invention. The structured data, which is an object to be processed, is of a structured document. A data storage device such as a magnetic disk device, and a communication device may be used as external devices. The structured data treating unit 3 may include: a document printing unit; a document content editing unit; software for controlling these units; and an automatic layout processing program.

Editing menus and commands displayed on the display unit 6 are inputted from the input unit 7. When a storage command out of these menus and commands is executed, the structured data of the structured document is delivered to the data output unit 8. The data output unit 8 then develops a data element of the structured document into data that can be outputted based on the above-mentioned operation, gives depth information thereto, and writes such data as sequential data to the magnetic disk device, which is the external device 10. On the other hand, when a read command is executed, the sequentially structured document data stored in the magnetic disk device are retrieved on a data element basis through the data input unit 2, and the retrieved data are built up into a structure based on the depth information.

Further, concurrent editing can be supported by editing a part of the structure of a structured document and data elements thereof while communicating with other structured document editing devices through external communication devices.

As described above, the structured data processor of the invention can be applied to a CAD system by handling graphic data as structured data. A printing device such as a plotter may be added to the external device for printing the graphics.

As is apparent from the foregoing, the invention is designed to execute input/output processing with structured data whose data volume is substantially reduced compared with that handled by conventional structured data processors. Therefore, the input/output processing time can be reduced to a significant degree to contribute to improving the processing time of the computer system as a whole.

Further, a small data volume means a small storage area occupancy, which opens the way to the application of the invention, e.g., to small-scale systems. In other words, much information can be stored by a data storage device that is not expensive nor of large-capacity. If the configuration of a system is equivalent to that of a conventional system, a remaining memory area can be utilized for an index, a cache, or the like. As a result, high-speed data referencing may be achieved. Moreover, the invention is advantageous in utilizing localization of data such as clustering. Data referencing involves searching of only a small area, thus contributing to high-speed search.

What is claimed is:

1. A structured data processor for processing structured data of a tree structure, comprising:

data input means for receiving sequential data and converting the received sequential data into data of the tree structure, the sequential data having data elements arranged in an order of depth, each data element forming a node of the structured data and having structural depth information directly corresponding to a node level on the tree structure; and structural position determining means for determining a structural position based on both of the structural depth information and the order of depth of each said data element of the sequential data inputted at the time of converting the sequential data by said data input means.

2. A structural data processor for processing structured data of a tree structure, comprising:

data output means for converting data of the tree structure into sequential data and outputting the sequential data, said sequential data having data elements each arranged in an order of depth, corresponding to a node of the tree structure, and having structural depth information directly corresponding to a node level on the tree structure;

wherein the data output means further includes means for tracing the data of the tree structure to determine the order of depth.

3. A data processor for processing structured data of a tree structure, comprising:

data input means for receiving sequential data and converting the received sequential data into data of the tree structure, the sequential data including data elements for forming nodes of the tree structure, each data element including information identifying a node level and arranged in an order of depth; and structural position determining means for determining a tree structural position of a data element based on the information identifying the node level and on the order of depth of the data elements.

4. The data processor of claim 1, wherein said structural position determining means finds a parent node of each node by analyzing the structural depth information and the order of depth.

5. The data processor described in claim 4, wherein said structural position determining means finds the parent node of a selected node by finding the node whose structural depth information is smaller than that of the selected node, and whose order of depth is earlier than that of the selected node.

6. The data processor of claim 3, wherein said structural positioning determining means determines a parent node of the data element by finding the node with a lower node level than that of the data element and with an earlier order of depth than that of the data element.

* * * * *